(12) United States Patent
Klug (10) Patent No.: US 12,064,825 B2
(45) Date of Patent: Aug. 20, 2024

(54) DEVICE FOR GRINDING SAW TEETH AND A CORRESPONDING METHOD

(71) Applicant: Georg Kesel GmbH & Co. KG, Kempten (DE)

(72) Inventor: Martin K. Klug, Kempten (DE)

(73) Assignee: Georg Kesel GmbH & Co. KG, Kempten (DE)

( * ) Notice: Subject to any disclaimer, the term of this patent is extended or adjusted under 35 U.S.C. 154(b) by 0 days.

(21) Appl. No.: 17/885,674

(22) Filed: Aug. 11, 2022

(65) Prior Publication Data
US 2023/0058157 A1    Feb. 23, 2023

(30) Foreign Application Priority Data

Aug. 19, 2021 (DE) ...................... 10 2021 121 577.3

(51) Int. Cl.
| | | |
|---|---|---|
| *B23D 63/12* | (2006.01) | |
| *B23D 63/00* | (2006.01) | |
| *B24B 3/58* | (2006.01) | |
| *B24B 19/00* | (2006.01) | |

(52) U.S. Cl.
CPC ......... *B23D 63/126* (2013.01); *B23D 63/001* (2013.01); *B23D 63/003* (2013.01); *B24B 3/586* (2013.01); *B24B 19/009* (2013.01)

(58) Field of Classification Search
CPC .. B23D 63/126; B23D 63/001; B23D 63/003; B23D 63/14; B23D 63/005; B23D 65/02; B24B 3/586; B24B 19/009; B24B 19/02; B24B 63/12; Y10T 409/102544; Y10T 409/10159

USPC ........ 76/28, 29, 45, 37–40, 48, 112; 451/48; 83/835, 852
See application file for complete search history.

(56) References Cited

U.S. PATENT DOCUMENTS

| | | | |
|---|---|---|---|
| 1,217,889 A | | 2/1917 | Brust |
| 1,841,455 A | * | 1/1932 | Schaefer ............... B23D 61/123 72/340 |
| 4,434,685 A | * | 3/1984 | Junker ................... B23D 65/02 76/43 |
| 4,693,145 A | | 9/1987 | Gustavsson |
| 2011/0030510 A1 | * | 2/2011 | Iseli ..................... B23D 63/005 76/112 |

FOREIGN PATENT DOCUMENTS

| | | |
|---|---|---|
| CN | 701519 A2 | 1/2011 |
| DE | 3537059 A1 | 5/1986 |

(Continued)

*Primary Examiner* — Ghassem Alie
(74) *Attorney, Agent, or Firm* — Dickinson Wright PLLC (57) ABSTRACT

A device for grinding pre-milled and hard metal-tipped teeth of saw bands, is provided. The device comprises a feed device for feeding a temporarily formed workpiece in a timed manner, wherein the temporarily formed workpiece is formed from a plurality of saw bands which are parallel to one another. The device further comprises a clamping device which clamps the plurality of saw bands against one another, and a grinding unit for simultaneously grinding a plurality of teeth. The grinding unit comprises a grinding wheel with a plurality of grinding profiles. A corresponding method is also provided, where the grinding unit grinds both the tooth backs and the tooth faces to final dimension in exactly one linear movement.

11 Claims, 6 Drawing Sheets

(56) References Cited

FOREIGN PATENT DOCUMENTS

| | | |
|---|---|---|
| DE | 10121370 A1 | 11/2002 |
| DE | 102018010378 A1 | 5/2020 |
| JP | H07237136 A | 9/1995 |
| WO | 9605931 A1 | 2/1996 |

* cited by examiner

DEVICE FOR GRINDING SAW TEETH AND A CORRESPONDING METHOD

This U.S. patent application claims priority to German patent application no. 10 2021 121 577.3, filed Aug. 19, 2021, the entire contents of which is incorporated herein by reference in its entirety.

BACKGROUND

1. Technical Field

The present invention relates to a device for grinding saw teeth tipped with hard metal, and to a corresponding method.

2. Related Art

In chip removal, hard metal-tipped saw blades and saw bands are of high economic significance and are used expansively. In the trade, electrical saber saws operated with two hands are often used for perpendicular cuts since the hard metal-tipped cutting edges thereof make them suitable for cutting through tree roots in the ground, for disassembling structural components, for cutting through metal by fire fighters and other rescue organizations, as well as for cutting through metals. However, such saw blades and saw bands are also used in the industry for machining metals, plastics or wood. Correspondingly high demands are made on the precision of the tooth geometries, which therefore cannot be produced with the required precision using normal milling processes.

Hard metal-tipped saw blades as well as bands have a large variability with respect to the tooth width and the tooth geometry. They are initially made from a blank in that a metal band is unwound from a coil, optionally turned and straightened. Raw teeth are milled into this metal band and hard metal pins are subsequently welded on in the transition area between the future tooth face and the future tooth back. These hard metal pins are then ground to size in a grinding machine, for the purpose of which diamond grinding wheels are commonly used. After this operating step, tooth face and tooth back are at the desired final dimension. Depending on the tooth pitch and wedge angle to be produced, a corresponding diamond grinding wheel is used for this purpose. Subsequently, grinding of the two side surfaces of the future saw band takes place, optionally followed by a cutting to the desired length of the finished saw blade or band. The unwinding of the blank from the coil as well as the further operating steps typically follow in a timed manner, in any case within those operating steps with which a hard metal-tipped saw blade/saw band to be manufactured is processed continuously. Here, if necessary, buffer paths between the individual processing stations (machines) have to be planned if the timing cannot be maintained throughout the entire manufacturing line.

The correct grain of the grinding wheels, adapted grinding parameters, as well as an optimal grinding pressure are important parameters for the grinding process on the tooth. Due to the high precision required, it was previously known to use corresponding grinding machines, which in each case process a hard metal-tipped tooth of a saw blade with respect to tooth face and back by means of grinding. Here, the manufacturing time per tooth is usually several seconds because the hard metal layer thickness to be removed often cannot be removed in a single linear movement of the grinding wheel. It is thus known to use a plurality of such processing machines in order to be able to simultaneously process a plurality of bands.

From DE 35 37 059 A1, a method and a device for grinding the teeth of saw blades and saw bands is known, comprising a mechanism for fixing and stepwise advancing a plurality of saw bands which are pressed by a movable gripping claw against a fixed gripping claw, wherein a grinding wheel is movable over the saw bands and grinds teeth of the saw bands.

Also, known from CH 701 519 A2 is a device and a method for processing metal bands into saw bands. For this purpose, the device has several reels by means of which the metal bands are brought together to form a stack and are fed into the device in a compressed state. Various clamping and push-down devices are provided in the device, which guide the metal bands rigidly along an axis in the device, where the metal bands are processed by a grinding wheel.

From DE 101 21 370 A1, a grinding machine for grinding teeth of hard metal-tipped saw blades is known, comprising a grinding head with two grinding spindles, each of which has at least one grinding wheel, each grinding spindle being associated with a saw blade.

From WO 96/05931 A1, in addition to a saw blade and a saw tooth, a method for machining a single saw blade is known, in which several teeth in the saw blade are processed simultaneously, and a grinding device capable of doing this.

SUMMARY

The present invention has the object of specifying a more efficient device and a more efficient method for grinding teeth.

The object relating to the device is achieved by means of a device for grinding pre-milled and hard metal-tipped teeth of saw bands, comprising a feed device for feeding a temporarily formed workpiece in a timed manner, wherein the temporarily formed workpiece is formed from a plurality of saw bands which are parallel to one another, further comprising a clamping device which clamps the plurality of saw bands against one another, further comprising a grinding unit for simultaneously grinding a plurality of teeth, wherein the grinding unit comprises a grinding wheel with a plurality of grinding profiles, wherein the grinding unit grinds both the tooth backs and the tooth faces to the desired final dimension in exactly one feed movement. According to the invention, the saw bands are pre-milled and provided with hard metal pins at the tooth tips thus produced, which pins are in particular only attached to the tooth tips but are not pre-machined in a substantial shaping manner by a grinding or milling device. The provision according to the invention of a plurality of grinding profiles on a grinding wheel, in particular a roller-shaped grinding wheel having a multiplicity of tooth face grinding profiles and tooth back grinding profiles, has the highly advantageous result that a block temporarily forming a workpiece is made up of a multiplicity of parallel and axially aligned saw bands can be processed simultaneously, thus that a plurality of teeth of a saw band, which in particular directly succeed one another in the axial direction, can be machined simultaneously, wherein the grinding wheel also processes the teeth of the saw bands which are parallel and adjacent to this saw band, of the temporarily formed workpiece. In this case, only one infeed movement of the grinding wheel is required before both tooth back and tooth face are to size. The desired final dimension according to the invention is to be understood in this context as meaning that the saw bands of the workpiece are each ready for use by an end user and accordingly do not require further regrinding. According to the invention, infeed is understood to mean the grinding movement of the grinding unit, thus, in particular, the linear movement of the grinding unit, during which at least part of the workpiece to be processed is processed. The feed movement is understood to mean the movement by which the workpiece is displaced, in particular linearly, within the device, so that after the feed movement a different part of the workpiece is arranged below the grinding unit for processing than before the feed movement. According to the invention, before a feed movement and after a feed movement, the grinding unit is preferably first pivoted over the workpiece so that the grinding unit is brought closer to the workpiece, and/or a subsequent adjustment of the grinding position is provided so that the grinding unit is arranged relative to the workpiece in such a manner that the teeth of all saw bands are ground over the entire width of the workpiece by a particularly purely linear movement of the grinding unit over the workpiece. The clamping device ensures that the teeth of the plurality of bandsaw blades, which are parallel to each other, are produced with the same manufacturing quality. Although this requires a longer processing time per temporarily formed workpiece, the multiplicity of simultaneously produced teeth according to the invention results in a significantly shorter manufacturing time per tooth. For this purpose, at least one clearance is provided in at least one, and in particular in all, grinding profiles, which clearance is arranged in particular on the grinding profile in such a manner that it preserves the tips of the teeth during a linear movement of the grinding unit. The clearances are in particular rounded recesses which do not impair the stability of the grinding unit and take into account the pivot movement of the grinding unit. According to the invention, the clearance is arranged in an area of the grinding profiles which is located at the tooth tip when the grinding unit is in the use state. For this purpose, the clearance is arranged and shaped according to the invention in such a manner that not only is a tooth tip not damaged due to the clearance after an linear movement of the grinding unit, but also both the tooth face and the tooth back remain ground and unimpaired over their entire length, i.e. in particular up to the tooth tip. For this purpose, it has been established according to the invention to arrange the clearance in the area of the tooth tip in the direction of the tooth face, so that the tooth tip in the area of the tooth back is not damaged while the tooth tip in the area of the tooth face is completely ground down to the desired final dimension.

In an embodiment of the device, it is provided that it comprises a push-down unit and/or a timing unit and/or a cutting unit. The push-down unit ensures that all tooth backs have the same height above the tooth base, the timing unit advantageously ensures that each temporarily formed workpiece is guided through the device at the correct cycle time, and the cutting unit provides for the cutting of saw bands to be manufactured to the desired final dimension, if saw blades are to be created. For this purpose, the timing unit is preferably formed by an in particular conical engagement mandrel which simultaneously engages in correspondingly shaped recesses of each saw band.

In an embodiment of the invention, it is further provided that it comprises spacers, preferably band-shaped spacers which can in particular be inserted between two adjacent saw bands of a workpiece, particularly preferably segment-shaped spacers which are arranged in the clamping device in a stationary manner. By means of this advantageous embodiment it is achieved that the hard metal pins which optionally protrude beyond the thickness of the saw band do not result in a negative impact on the processing of the adjacent saw band in the temporarily formed workpiece. Here, the thickness of the spacers preferably corresponds to at least twice the tolerances of the length of the hard metal pins. For this purpose, the spacers are in particular band-shaped spacers, preferably rotating but, according to the invention, preferably segment-shaped spacers, which are arranged in the clamping device in a stationary manner.

Finally, it is advantageously also provided that the device combines 2 to 80, in particular 5 to 60, preferably 20 to 40 saw bands to temporarily form a workpiece.

The object relating to the method is achieved by means of a method for grinding hard metal-tipped teeth of saw bands, comprising the steps of: —clamping a plurality of parallel saw bands, which are aligned axially to one another, against one another to create a temporarily formed workpiece, —simultaneously grinding a plurality of tooth backs and tooth faces of the temporarily formed workpiece in exactly one linear movement of the grinding unit, —further transporting the processed temporarily formed workpiece and re-clamping to create a new temporarily formed workpiece. The simultaneous grinding according to the invention of a multiplicity of raw teeth of a bundle of individual saw bands along an axial section of these saw bands highly advantageously leads to very short tooth processing times. During a processing time of several minutes of the multiplicity of raw teeth of the temporarily formed workpiece, significantly more than 1,000 teeth are often completed, depending on the tooth geometry to be manufactured.

In an embodiment of the method, it is provided that it further comprises a method step after the step of simultaneously grinding a plurality of tooth backs and tooth faces in only one linear movement of the grinding unit, after which the remaining tooth backs and tooth faces of the temporarily formed workpiece are ground in further linear movements. This method step is particularly necessary for particularly long saw bands whose length exceeds the length of the corresponding side of the grinding unit. Thus, the length of the grinding unit does not necessarily have to correspond to that of the saw bands to be manufactured. According to the invention, it is possible to move the grinding unit or the workpiece itself between the grinding processes on two areas of a temporarily formed workpiece in such a manner that in a next linear movement, the grinding unit processes an unprocessed area of the workpiece.

In one embodiment of the method, it is provided that it further comprises one or more of the following steps: —pre-milling of raw teeth in desired areas of the saw band, —unwinding a plurality of saw bands, each comprising pre-milled raw teeth and welded-on hard metal pins, from a coil in each case, —turning and aligning the respective saw bands, —inserting spacers between two adjacent saw bands, —pushing down a temporarily formed workpiece during grinding, —winding up a plurality of processed saw bands to form a coil in each case.

In one embodiment of the method it is provided that it comprises a step of cutting processed the saw band to length instead of winding it up.

The invention will be described in an exemplary manner in a preferred embodiment with reference to a drawing, wherein further advantageous details of the figures are apparent from the drawing. Functionally identical parts are provided with identical reference numerals.

BRIEF DESCRIPTION OF THE DRAWINGS

In detail, the figures of the drawings show.

DETAILED DESCRIPTION OF EXAMPLE EMBODIMENTS

Figure 1:
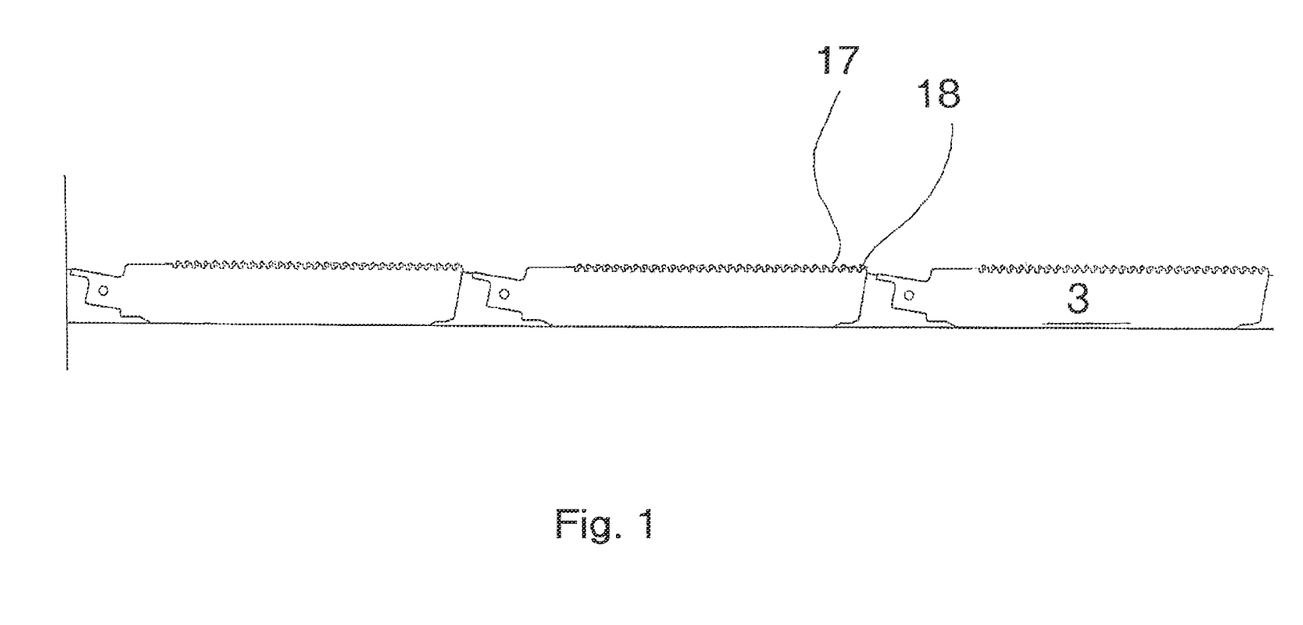
FIG. 1: a saw band in the raw state.

FIG. 1 shows a saw band in the state prior to processing by the device according to the invention, which is already designated here as saw band 3, even though it is still in the raw state. Milled-in raw teeth 18, already comprising welded-on hard metal pins 17 in the area between the later tooth face and the tooth back can be seen. Another advantage of the invention can be seen, namely that raw teeth 18 are milled in specifically only into certain areas of the saw band 3, namely into those which are later processed into saw blades by means of a cutting unit. This reduces the manufacturing time because no teeth need to be milled in at the areas which are omitted later. According to the invention, such a band, which is pre-milled and provided with hard metal pins 17, is unwound from a coil or is fed to a device according to the invention after welding.

Figure 2:
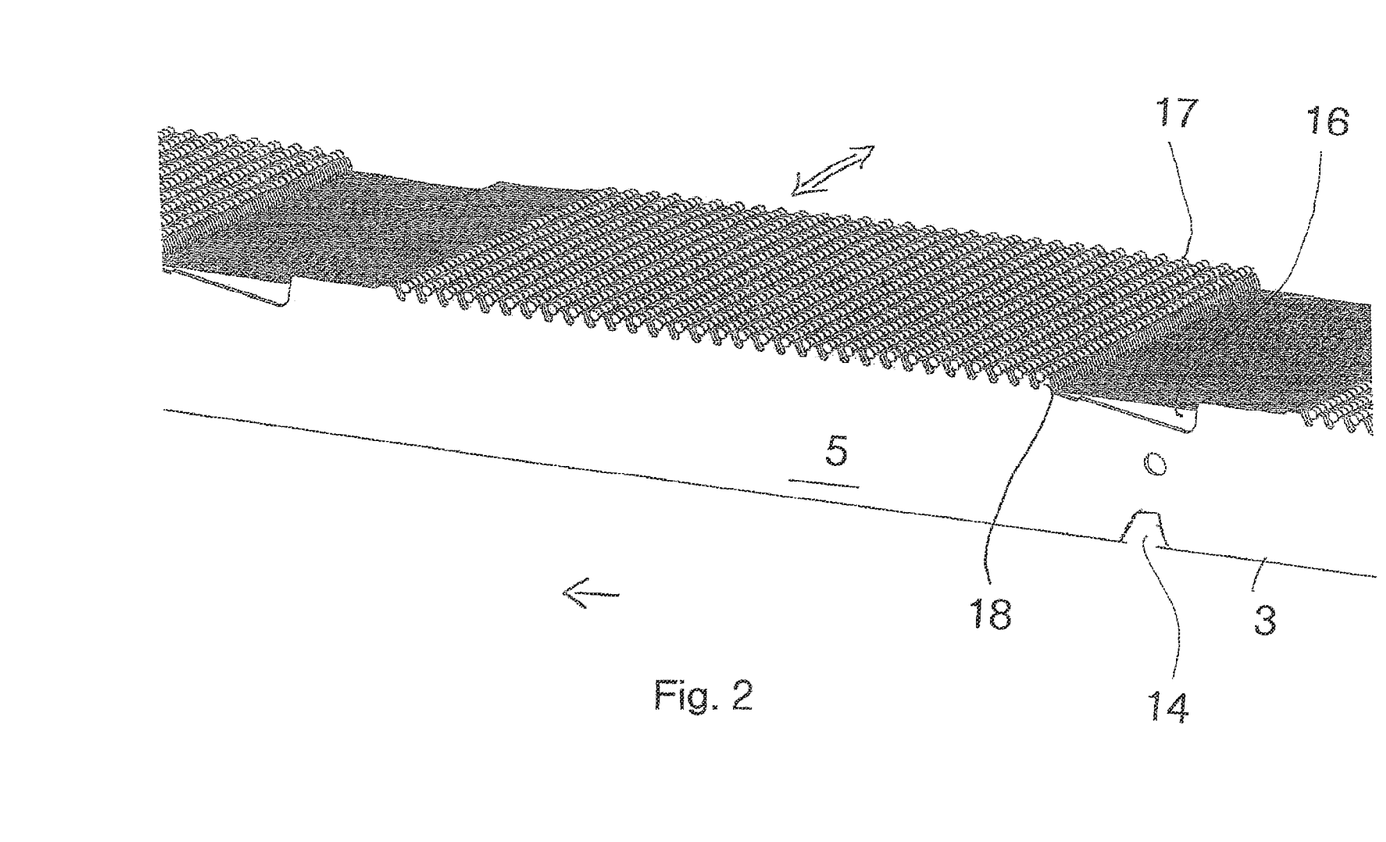
FIG. 2: a temporarily formed workpiece from 40 saw bands.

FIG. 2 shows a temporarily formed workpiece 5 formed here from 40 saw bands 3 which are parallel to one another, in the raw state. Between these saw bands there are 39 spacers 16, thus in each case one spacer 16 between two adjacent saw bands 3. The individual saw bands 3 of the temporarily formed workpiece 5 are aligned axially to one another, so that a grinding process transversely to the longitudinal direction of the saw bands can take place such that all teeth of all saw bands 3 can be manufactured with the same dimension. The feed direction is indicated with an arrow, the processing direction with a double arrow since, according to the invention, the processing can be performed orthogonally in both directions to the longitudinal axis. A timing unit 14, which is designed here as recess in a saw band 3, can also be seen. According to the invention, a correspondingly shaped mandrel engages in these recesses, which are also aligned and flush, and thus ensures for each positive connection that the orientation of the bands relative to one another is maintained even after clamping.

Figure 3:
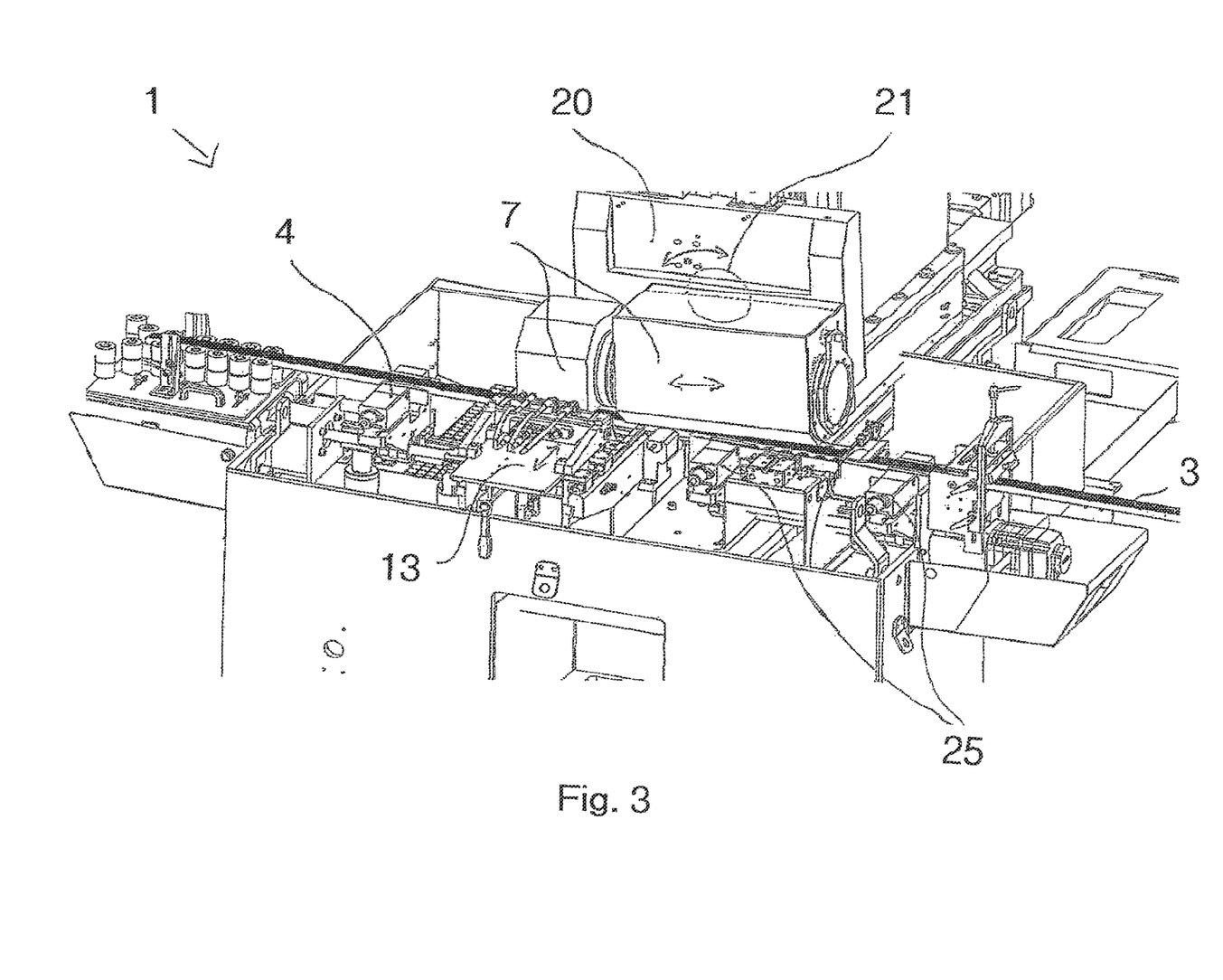
FIG. 3: a partial view of a device according to the invention.

FIG. 3 shows a device 1 according to the invention in partial view. A bundle of, in this case, 40 parallel saw bands 3 coming from the right is conveyed into the device 1. A clamping device 6, which is not shown here, clamps the bundle of saw bands 3 in the area of the grinding unit 7 and thus temporarily creates a workpiece 5 during the grinding process. The clamping device 6 is covered by the push-down unit 13. The temporarily formed workpiece is pushed onto a defined support, in particular by means of a multi-finger push-down unit 13, so that a defined, dimensionally stable tooth tip height can be obtained across all teeth. The push-down unit 13 is designed to be displaceable and can thus be displaced into a non-interfering position outside of a grinding process area after pushing down and clamping the saw blades/bands. A supply device 25 is illustrated on the right.

In FIG. 3, a feed device 4 is shown on the left, wherein the clamping of the temporarily formed workpiece is released during the timed conveying through the device 1 while the feed device 4 already clamps the saw band bundle. The feed device then continues to convey the saw band bundle, stops, releases the clamping, whereupon the clamping unit 6, in turn, clamps in the operating area of the grinding unit 7 and thus creates a temporarily formed workpiece 5. By means of this intermittingly changing clamping, a timed transport is ensured on the one hand, and, on the other hand, a precise grinding process is made possible. A base plate for the grinding unit 7 as well as a pivoting device 20 are illustrated; the movements are indicated by means of arrows. If the workpiece 5 is conveyed further by the feed device, the grinding unit 7 is pivoted away from the workpiece 5 by the pivoting device 20 before and after this and then pivoted in again so that a feed of the workpiece 5 is not blocked by the grinding unit 7.

Figure 4:
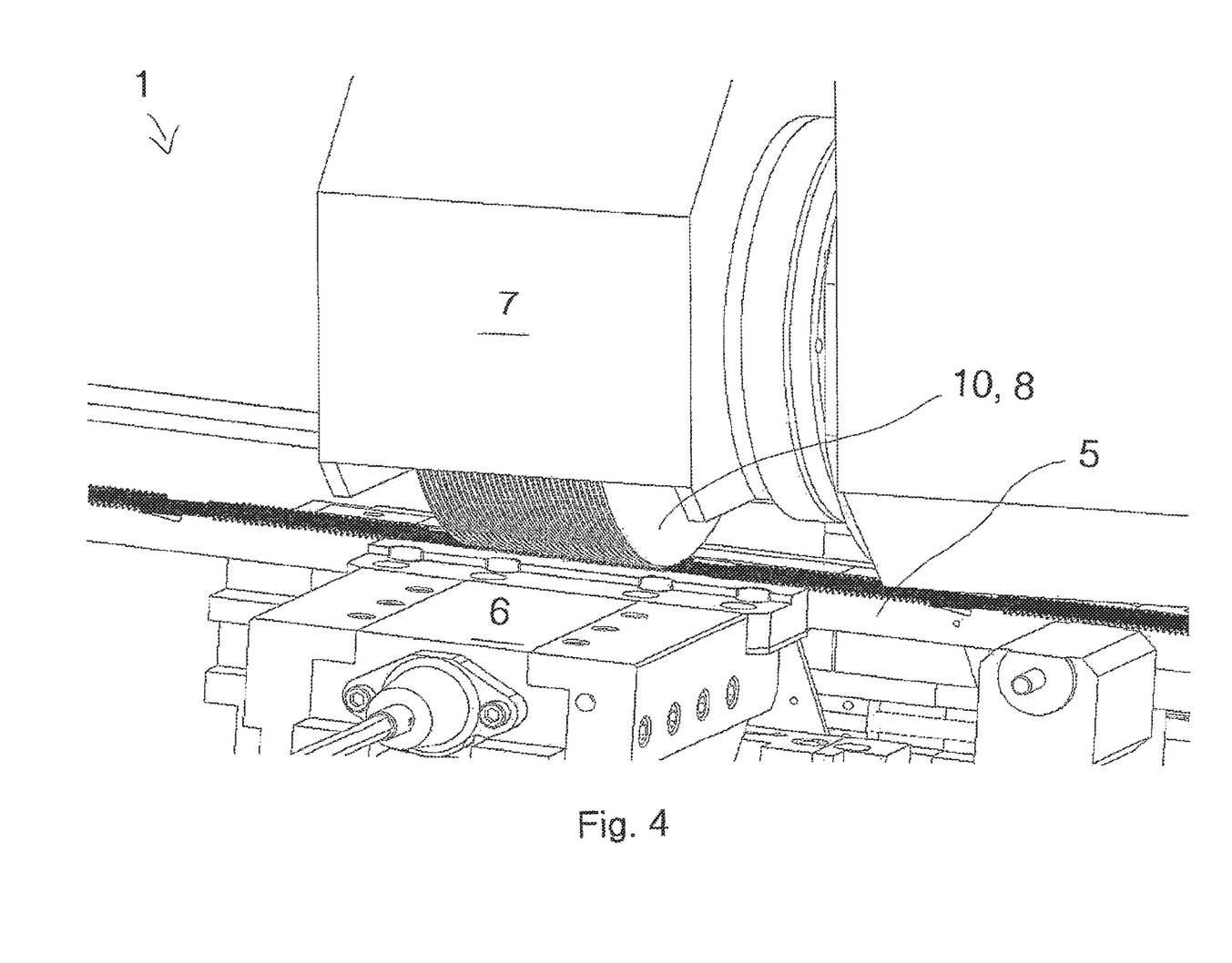
FIG. 4: a detail view of the grinding unit.

FIG. 4 shows a detail view of the grinding wheel 8 according to the invention of the grinding unit 7 in the installed position in the device 1 according to the invention, as well as the clamping device 6. The grinding wheel 8 is designed as roller 10, the grinding profile of which is designed according to the tooth pitch to be manufactured. When changing the tooth geometry to be manufactured, the grinding wheel 8 has to be changed as well. It can be clearly seen that all raw teeth below the grinding wheel 8 of a saw band 3 of the temporarily formed workpiece 5 are ground simultaneously, wherein the grinding wheel 8 is moved transversely to the longitudinal direction of the workpiece 5 in order to process all of the teeth of a saw band section within the grinding wheel operating width.

Figure 5:
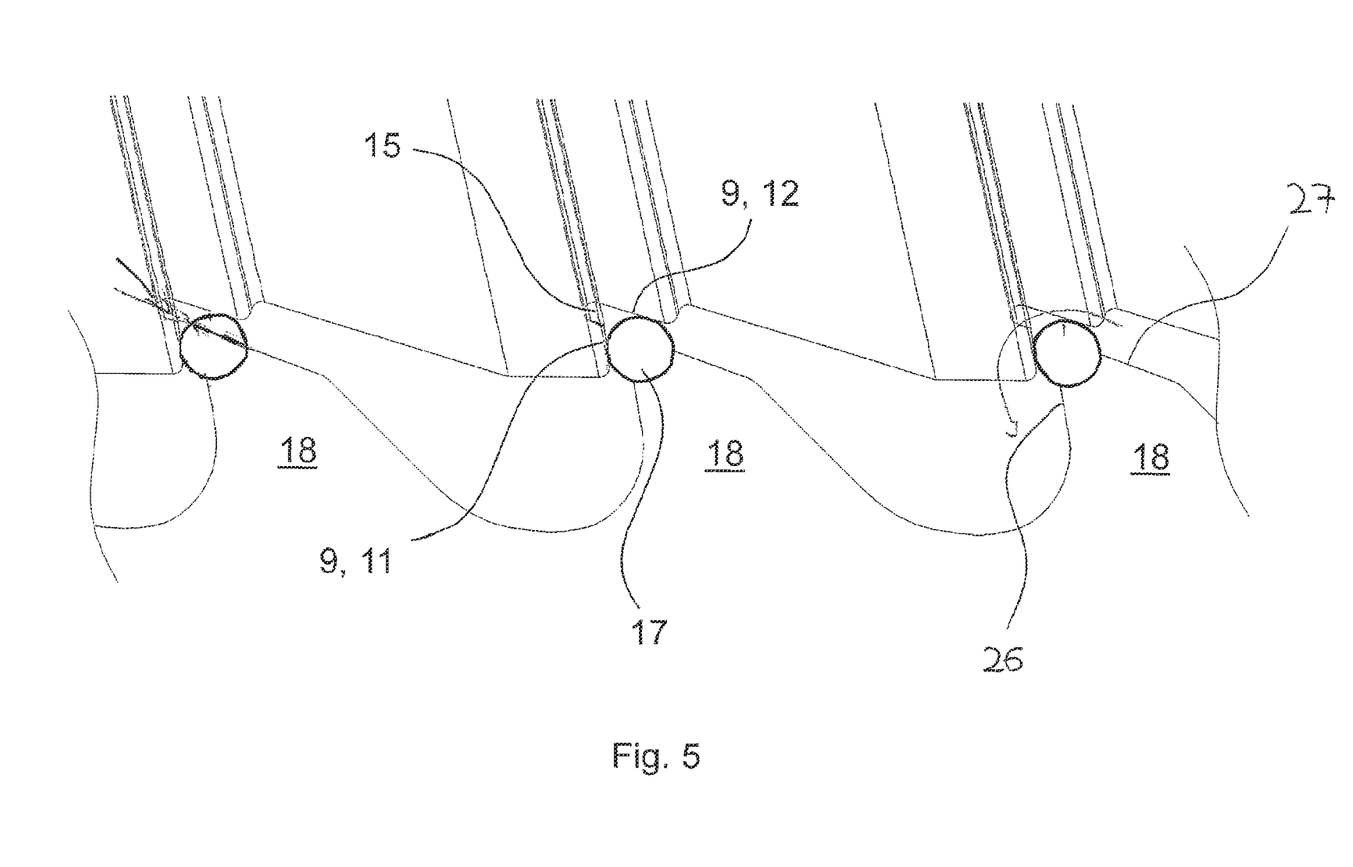
FIG. 5: a detail of a grinding wheel.

FIG. 5 shows a section of a grinding wheel 8 according to the invention as a roller 10 as well as a corresponding section of a saw band 3 with pre-milled raw teeth 18 and hard metal pins 17, each of which are welded on. The tooth tips are formed by the carbide pins 17 already ground in the present illustration. The grinding wheel 8 has a grinding profile 9 formed by a plurality of identical tooth face grinding profiles 11 and identical tooth back grinding profiles 12. In a transition of tooth face grinding profiles 11 and tooth back grinding profiles 12, a clearance 15 is provided in each case, which in the present example is rounded due to simple design-related advantages but, alternatively, can also be designed differently. According to the invention, the clearance 15 is designed in particular in such a manner that both the tooth back 27 and the tooth faces are ground in only one linear movement of the grinding unit and the tooth tip remains intact. For this purpose, the clearance 15 has an area which, in a state applied to the tooth tip, runs parallel to the tooth back 27 but does not rest against it. This allows a straight cut of the tooth back 27 and a clear tooth tip without any roundings. The entire tooth face 26 is ground over its entire length despite the clearance since the grinding wheel 8 is designed as a roller 10 and thus various angular sections of the grinding wheel 8 come into contact with the tooth face 26 during a linear movement. For the reasons mentioned, the clearance allows simultaneous processing of the tooth backs 27 and the tooth faces 26 by only one linear movement.

Figure 6:
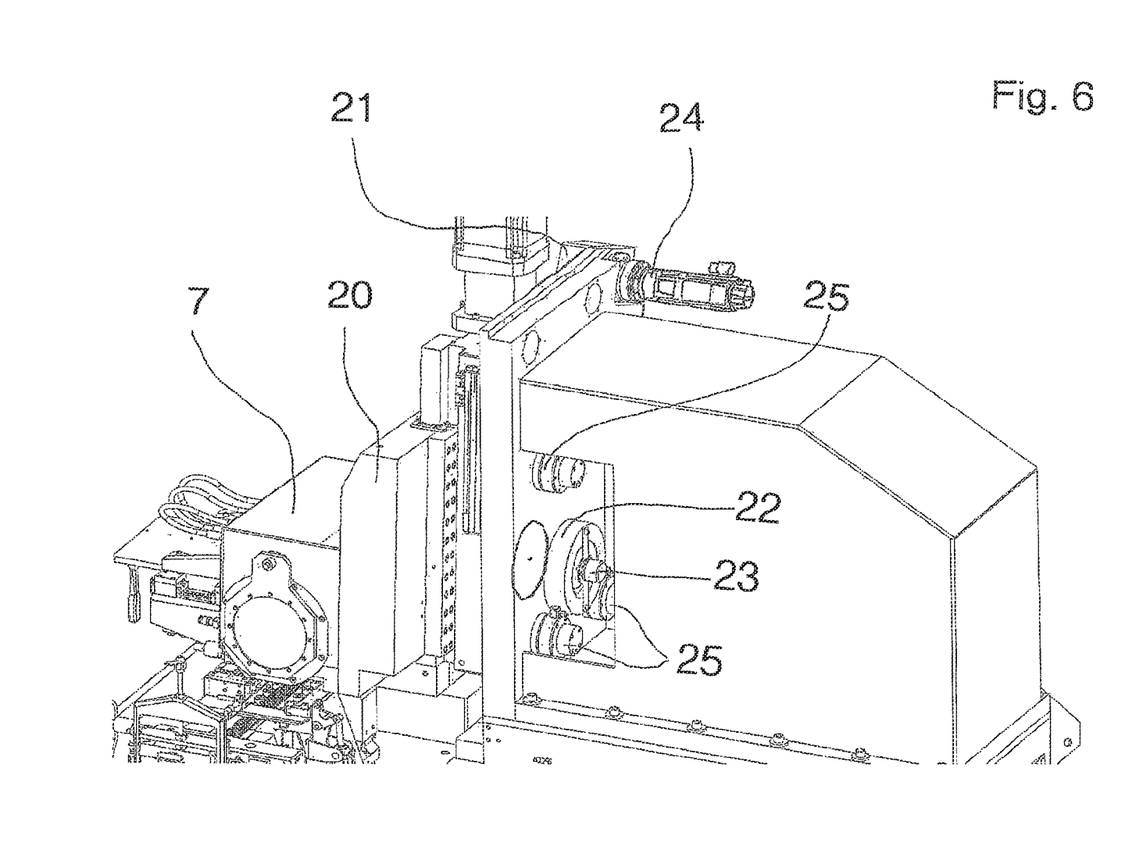
FIG. 6: a further partial view of the device according to the invention.

FIG. 6 shows a further view of a device 1 according to the invention. The base plate for the grinding unit 7 as well as a pivoting device 20 comprising a drive 23 can be seen. A pivot bearing 21 and three fastening devices 24 as well as a rotary encoder 22 for the pivoting device 20 are illustrated. The grinding unit 7 is moved and the temporarily formed workpiece is created by means of these assembly groups.

Depending on the different tooth geometries to be manufactured, in particular relating to the clamping angle at the tooth face and the free angle at the tooth back, the grinding unit 7 is pivoted about a corresponding angle by means of a pivoting device 20, which is arranged downstream of the base plate (on which the grinding unit 7 is mounted).

The pivoting device 20 consists of a stable pivot bearing 21 comprising a high-resolution rotary encoder 22 for the exact angle adjustment as well as an NC-controlled drive 23 (pivoting movement initiated via a tooth pinion and a tooth segment) as well as an automatic fastening device 24.

To support the unwinding process of the individual coils on the inlet side, a supply device 26, which is timed with the same timing as the feed device 4, is provided to the right of the clamping device 6.

Like the feed device 4, the supply device 25 consists of a clamping unit, a guide unit and a drive unit.

The invention thus achieves tooth processing times that are a factor of 20 or more below the present processing times, even if up to several minutes of machining time are required per temporarily formed workpiece. However, since often more than 2,000 teeth are finished here at the same time, or even more depending on the tooth geometry, the tooth processing times are correspondingly short.

In a highly advantageous manner, the grinding process according to the invention allows for high manufacturing speeds while simultaneously ensuring highest processing precision, for the purpose of which a grinding wheel and a saw band bundling had to be developed.

For this purpose, the core method according to the invention consists of the steps of clamping a plurality of parallel saw bands, which are aligned axially to one another, against one another to temporarily create a temporarily formed workpiece, simultaneously grinding the temporary workpiece at a plurality of locations which are axially spaced apart, and further transporting the processed temporarily formed workpiece, and re-clamping to create a new temporarily formed workpiece. The following steps are added for a complete manufacturing process: pre-milling of raw teeth in desired areas of the saw band, unwinding a plurality of saw bands, each comprising pre-milled raw teeth and welded-on hard metal pins, from a coil in each case, turning and aligning the respective saw bands, inserting spacers between two adjacent saw bands, pushing down a temporarily formed workpiece during grinding, as well as after the core steps of winding up a processed saw band to form a coil, alternatively cutting a processed saw band to length instead of winding it up.

The invention claimed is:

1. A device for grinding pre-milled and hard metal-tipped teeth of saw bands, the device for grinding comprising a feed device for feeding a temporarily formed workpiece in a timed manner, wherein a temporary workpiece is temporarily formed from a plurality of saw bands which are parallel to one another, the device for grinding further comprising a clamping device which clamps the plurality of saw bands against one another, the device for grinding further comprising a grinding unit for simultaneously grinding a plurality of teeth, wherein the grinding unit comprises a grinding wheel with a plurality of grinding profiles, wherein the grinding unit has a clearance arranged in the area of a tooth tip of the teeth of the saw bands in the direction of the tooth face of the teeth of the saw bands so that the grinding unit grinds both the tooth backs and the tooth faces of the teeth of the saw bands to a desired final dimension in exactly one linear movement of the grinding unit orthogonally to a longitudinal axis of the plurality saw bands such that the tooth tip in the area of the tooth back is not damaged while the tooth tip in the area of the tooth face is completely ground down to the final dimension, such that the saw bands of the temporarily formed workpiece are each ready for use and do not require further regrinding.

2. The device for grinding pre-milled and hard metal-tipped teeth of saw bands according to claim 1, wherein the grinding wheel is designed as a roller which comprises a multiplicity of tooth face grinding profiles and tooth back grinding profiles.

3. The device for grinding pre-milled and hard metal-tipped teeth of saw bands according to claim 1, wherein the device for grinding comprises a push-down unit and/or a timing unit.

4. The device for grinding pre-milled and hard metal-tipped teeth of saw bands according to claim 1, wherein the device for grinding comprises spacers, which can be inserted between two adjacent saw bands of the temporarily formed workpiece.

5. The device for grinding pre-milled and hard metal-tipped teeth of saw bands according to claim 4, wherein the spacers are band-shaped spacers.

6. The device for grinding pre-milled and hard metal-tipped teeth of saw bands according to claim 5, wherein the spaces are segment-shaped spacers arranged in the clamping device in a stationary manner.

7. The device for grinding pre-milled and hard metal-tipped teeth of saw bands according to claim 1, wherein each grinding profile has a clearance so that the grinding unit grinds both the tooth backs and the tooth faces to final dimension in exactly one linear movement of the grinding unit orthogonally to a longitudinal axis of the plurality saw bands such that the tooth tip in the area of the tooth back is not damaged while the tooth tip in the area of the tooth face is completely ground down to the final dimension, such that the saw bands of the temporarily formed workpiece are each ready for use and do not require further regrinding.

8. A method for grinding hard metal-tipped teeth of saw bands, comprising the steps of clamping a plurality of saw bands using the device of claim 1, wherein the saw bands are parallel and aligned axially to one another, against one another to create a temporarily formed workpiece, simultaneously grinding a plurality of tooth backs and tooth faces of the temporarily formed workpiece in exactly one linear movement of the grinding unit, further transporting the processed temporarily formed workpiece and re-clamping to create a new temporarily formed workpiece.

9. The method according to claim 8, further comprising a method step after the step of simultaneously grinding a plurality of tooth backs and tooth faces in only one linear movement of the grinding unit, after which the remaining tooth backs and tooth faces of the temporarily formed workpiece are ground in further linear movements of the grinding unit.

10. The method according to claim 8, further comprising one or more of the following steps: pre-milling raw teeth in desired areas of a metal band, unwinding a plurality of saw bands each having pre-milled raw teeth and welded-on hard metal pins from a coil in each case, turning and aligning the respective saw bands, inserting spacers between two adjacent saw bands, pushing down a temporarily formed workpiece before clamping, and winding up at least one processed saw band to form a coil.

11. The method according to claim 8, comprising a step of cutting a processed saw band to length instead of winding it up.

* * * * *